Oct. 24, 1967   F. J. MEYER   3,348,677
DISTRIBUTION DEVICE FOR BULK GOODS
Filed Dec. 17, 1965
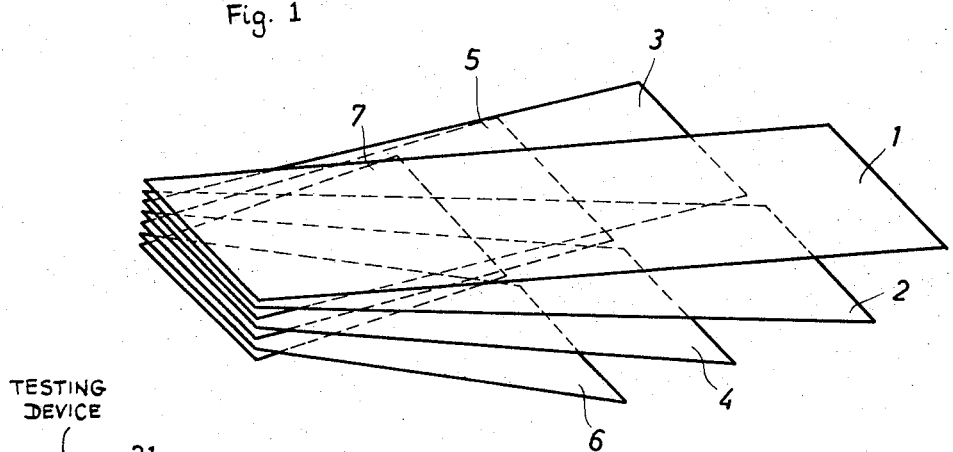
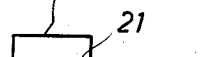
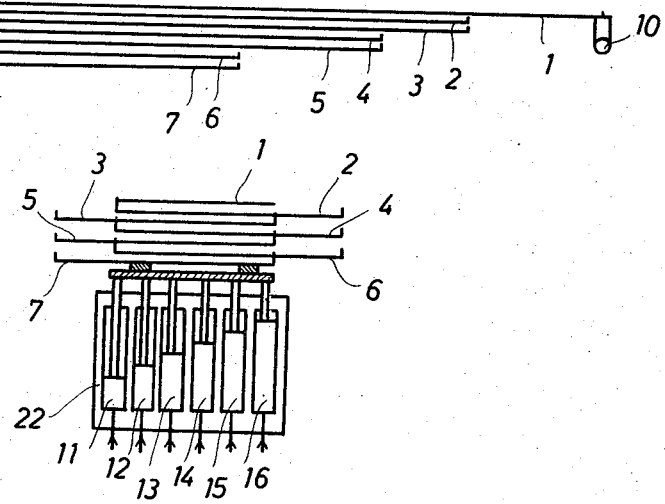
Inventor
Franz Josef MEYER
By  Spencer & Kaye
Attorneys

3,348,677
DISTRIBUTION DEVICE FOR BULK GOODS
Franz Josef Meyer, Opladen, Germany, assignor to Goetzewerke Friedrich Goetze AG, Burscheid, Germany
Filed Dec. 17, 1965, Ser. No. 514,492
7 Claims. (Cl. 209—74)

ABSTRACT OF THE DISCLOSURE

An arrangement for sorting bulk goods according to their quality or grade including a plurality of discharge channels disposed one above the other and rigidly connected together for simultaneous movement, and lifting means for lifting all of the channels simultaneously so as to place a selected channel, corresponding to a particular quality or grade, at the level of a surface from which the goods are fed, the channels being moved by the lifting device in accordance with a signal indicating the particular quality or grade of each successive piece to be sorted.

---

The present invention relates to a device for sorting bulk goods, such as piston rings, into several grades of quality after the goods have been processed by a testing or processing device.

Generally bulk goods, such as piston rings having, for example, a turn down edge or a top bevel at the bearing surface, are processed in batches when operating in an economic manner. With reference to piston rings, grooves are plunge-cut into the bearing surfaces of two neighboring rings with a single cutting tool so that the piston rings must be sorted, for example, in such a manner that they are in the correct position for the subsequent processing step. Previously, this sorting was done by hand, however, when working with a great quantity of pieces, this mode of operation is too time consuming, and therefore attempts have been made to align the rings by means of an automatic sorting machine. In this connection, the main problem was the removal of the rings from the working table of the testing or processing device with a high rate of speed in order to achieve a higher capacity than in the manual sorting operation. Such prior automatic sorting devices included the use of magnetically controlled plates which did not provide the required high speed and mechanical transporting devices which were unsatisfactory in that the use thereof placed stress on the goods and resulted in damaged goods and in many cases a change in shape or damage to the goods must be avoided.

Sorting devices are also known wherein the sorting process is effected by a photocell controlled jet of air. This jet of air blows the components not exhibiting the desired characteristic of the goods to be sorted off of a conveyor belt. However, the sorting speed is too slow in this process, since each individual piece of goods which has to be sorted must be separated from the other pieces on the conveyor belt in order to carry out the sorting step with a sufficient degree of accuracy. In order to overcome this disadvantage, the pieces were allowed to fall through a guide tube which introduced the pieces exactly into the light beam axis of the photoelectric device. However, here again the sorting speed was limited by the reaction velocity of the photoelectric cells and it was impossible to sort more than two classes such as a single good class and a single bad class of goods.

In contradistinction thereto, it is an object of the present invention to provide means for rapidly sorting goods into a plurality of quality grades or the like.

It is another object of the present invention to provide a sorting device wherein the goods to be sorted are not placed under mechanical stress.

The present invention is based on the discovery that the individual pieces of goods to be sorted should not be guided by a conveying means such as an air jet into several different directions depending upon the quality grades when a rapid fine sorting is desired, but that it is better to employ for this purpose various discharge channels whose inlet opening is lifted or lowered in front of the outlet opening of the testing or processing device. Therefore, in accordance with the present invention, there is provided a sorting device at the outlet of the testing or processing device and having one discharge channel for each quality grade of the sorted goods. The discharge channels are provided in a stacked arrangement one above the other and are connected with an elevating mechanism for lifting the stacked channels to a different degree but positioning the inlets of the channels to the same height.

According to a feature of the present invention, the discharge channels for the sorting device extend at various angles with respect to one another and wherein the inlet edges are aligned in a plane. In this way the receiving stations, such as pins, for picking up the sorted goods can be positioned in a more advantageous manner. Thus, the channels form a sorting fan in parallel relationship and extending on both sides of a normal channel. The length of the discharge channels may also be different and can therefore be adapted to the receiving station pertaining to the particular channel.

Additional objects and advantages of the present invention will become apparent upon consideration of the following description when taken in conjunction with the accompanying drawings in which:

FIGURE 1 is a perspective view of the sorting device of the present invention.

FIGURE 2 is a side view of the sorting device in operating relationship to a testing device.

FIGURE 3 is a front view of the sorting device according to the present invention.

Referring now to the drawings, there is shown in FIGURE 1 a sorting device according to the present invention for sorting piston rings into seven quality grades. The sorting device comprises seven discharge channels with channels 2, 3, 4, 5, 6, 7 being provided in a fan like arrangement on both sides and extending in parallel below a center or a normal channel 1. The discharge channels may correspond to the quality grade of the piston rings to be sorted for example as follows: undersize piston ring-channel 7; product-5; product-3; product-1; product-2; product-4; and oversize ring-channel 6. Thus, the different product quality grades will be placed on the proper discharge channels and the undersize and oversize grades will be placed on channel 7 and 6, respectively. As shown, the inlet edges of the discharge channels are aligned in a plane with the channels extending in a parallel fan-like arrangement.

The operating position of the sorting device according to the present invention is shown in FIGURE 2 wherein the sorting device is positioned behind a worktable 8 of a testing or processing device 21 at which the piston rings to be sorted arrive. A test piece 9 in a form of a piston ring is shown on the worktable between the testing device and the sorting device. For the sake of simplicity, the sorting fan, as shown in FIGURE 2, may be swiveled about the pivot means 10 and thus if the number of grades to be sorted is not too large, overcomes the need for a parallel extension of the channels which would otherwise be necessary. The sorting device is also provided with an elevating mechanism 22 comprising a series of pneumatically actuated pistons of different lengths disposed in identical compressed air cylinders 11, 12, 13, 14, 15, 16 as shown in FIGURE 3. The elevating mechanism is provided at the inlet end of the sorting device and contacts the lowermost discharge channel. As shown in FIGURES 2 and 3, these channels are flat parallelogram shaped members having upwardly extending flanges about three sides thereof with at least one of the flanges forming a support member for the channel above. The channels are formed in a stacked arrangement and therefore the movement of the lowermost channel causes the other channels to move a corresponding distance.

As shown in FIGURE 3, a compressed air cylinder 11 serves for lifting or lowering the channel 7 with the other cylinders 12 through 16 serving to raise and lower discharge channels 6 to 2, respectively. No cylinder is provided for the normal channel 1 since it is initially positioned at the proper height. Feed lines are shown connected with the compressed air cylinders and represents, as shown in FIGURE 2, a signal line connected between the testing device 21 and the elevating mechanism 22 and a compressed air supply line fed by compressed air supply 23, which preferably also feeds the testing device and serves for conveying the goods onto the discharge channel. It is noted that a compressed air cylinder is not provided for the discharge channel 1 since this channel is initially positioned at the height of the worktable.

The operation of the sorting device is such that after the quality grade of the test piece 9 has been determined by the testing device 21, a signal is fed to the compressed air cylinder corresponding to that quality grade and the compressed air cylinder is thereby actuated. The cylinder lifts the sorting fan to such a height that the inlet opening of the channel corresponding to that grade is brought to the elevation of the worktable 8. The test piece or piston ring 9 is then pushed onto this channel by an air jet and arrives at a receiving station, for example a pin or the like, which is positioned behind the discharge channel. Since the discharge channels are positioned one above the other in a stacked arrangement, only a short time is required for switching between quality grades and discharge channels 1 through 7.

Thus, the present invention provides a sorting device wherein a plurality of quality grades may be sorted at a high rate of speed. The lifting and lowering of the set of channels takes place much faster than, for example, the pivoting of a swivel table. It is also noted that the rings are not under mechanical stress through impact, pressure, or falling, and can be sorted into different grades with a great speed. The grades may be of any desired number and this number is only limited by the distance of the discharge channels of the highest grade number from the discharge channel of the normal grade. Accordingly, a further increase in the sorting speed may be accomplished by providing a set of channels positioned in part above and in part below the normal channel with the difference in the piston length and thus in the stroke of the piston not being an absolute value but being provided according to the arithmetical sign since the movement of the piston is either up and down or vice versa. Therefore, in case of a seven grade sorting fan having three channels lying above and three channels lying below the normal channel, the piston lengths and therefore the strokes of the piston can be absolutely identical with respect to corresponding pairs. With such an arrangement, that is by lifting half of the discharge channels to the height of the outlet opening of the testing or processing device and lowering the other half to this height by the elevating mechanism, the lifting height is reduced to half its original value and a further increase in the sorting speed is obtained.

It will be understood that the above description of the present invention is susceptible to various modifications, changes, and adaptations, and the same are intended to be comprehended within the meaning and range of equivalents of the appended claims.

What is claimed is:

1. A device for sorting bulk goods into a plurality of quality grades after such goods have been processed by a testing device, comprising, in combination:
   a plurality of discharge channels, one of which constitutes a normal channel, for receiving the processed bulk goods, each of said channels corresponding to one quality grade of the bulk goods, and the other said discharge channels each being stacked with respect to said normal channel at a different fixed vertical distance therefrom; and
   a lifting mechanism coupled to said discharge channels for moving all of said channels in unison to selectively position a selected one of said channels at a predetermined height;
   wherein said normal channel is initially positioned at the predetermined height and said lifting mechanism includes a plurality of lifting devices each arranged for lifting said channel by a different predetermined amount so as to position a respective one of the other stacked discharge channels at such height.

2. A device as defined in claim 1 wherein said discharge channels are provided with inlet edges which are aligned in a plane and said discharge channels extend in parallel to one another in a fan-like arrangement such that the outlet edges of at least some of said channels are offset with respect to the outlet edges of others of said channels in a direction parallel to the plane along which their inlet edges are aligned.

3. A device for sorting bulk goods into a plurality of quality grades after such goods have been processed by a testing device, comprising, in combination:
   a plurality of discharge channels, one of which constitutes a normal channel, for receiving the processed bulk goods, each of said channel corresponding to one quality grade of the bulk goods, and the other said discharge channels each being stacked with respect to said normal channel; and
   a lifting mechanism coupled to said discharge channels for selectively positioning a selected one of said channels at a predetermined height, said normal channel being initially positioned at such predetermined height and said lifting mechanism being provided with different lifting levels each for positioning a respective one of the other stacked discharge channels at such height, said lifting mechanism comprising a plurality of compressed air cylinders having air actuated pistons of different lengths disposed therein for providing the different lifting levels.

4. A device as defined in claim 3 and further including a source of compressed air for said lifting mechanism, said source of compressed air also serving for conveying the bulk goods onto said discharge channels.

5. A device as defined in claim 3 wherein said discharge channels each comprise a flat parallelogram shaped member having upwardly extending flanges about three sides thereof.

6. A device as defined in claim 4 wherein at least a portion of said flanges on one side of each of said channels forms a supporting member for the channel positioned above.

7. A device as defined in claim 6 wherein said stacked discharge channels are provided with a pivot means about which said channels may be rotated.

References Cited

UNITED STATES PATENTS 1,246,358 11/1917 Trew _____ 209—110
2,093,992 9/1937 Braam _____ 271—64

M. HENSON WOOD, Jr., *Primary Examiner.*

R. A. SCHACHER, *Assistant Examiner.*